F. CONTI.
AUTOMATIC BALANCED RUDDER FOR AIR, WATER, AND SUBMARINE CRAFT.
APPLICATION FILED JAN. 24, 1920.

1,382,170.   Patented June 21, 1921.
9 SHEETS—SHEET 4.

INVENTOR
F. Conti

F. CONTI.
AUTOMATIC BALANCED RUDDER FOR AIR, WATER, AND SUBMARINE CRAFT.
APPLICATION FILED JAN. 24, 1920.

1,382,170.

Patented June 21, 1921.
9 SHEETS—SHEET 5.

INVENTOR

F. CONTI.
AUTOMATIC BALANCED RUDDER FOR AIR, WATER, AND SUBMARINE CRAFT.
APPLICATION FILED JAN. 24, 1920.

1,382,170.

Patented June 21, 1921.

INVENTOR

UNITED STATES PATENT OFFICE.

FRANCISCO CONTI, OF BUENOS AIRES, ARGENTINA.

AUTOMATIC BALANCED RUDDER FOR AIR, WATER, AND SUBMARINE CRAFT.

1,382,170. Specification of Letters Patent. Patented June 21, 1921.

Application filed January 24, 1920. Serial No. 353,840.

*To all whom it may concern:*

Be it known that I, FRANCISCO CONTI, a citizen of the Argentine Republic, residing at Buenos Aires, Argentine Republic, have invented certain new and useful Improvements in Automatic Balanced Rudders for Air, Water, and Submarine Craft, of which the following is a specification.

This invention relates to ship controlling means and more particularly to an improved rudder, the means for operating the same and the method of steering a ship thereby.

Heretofore, rudder mechanism has been constructed in which the rudder has been directly and positively operated by power either manual or otherwise aboard ship, necessitating in large ships either a powerful operating mechanism or reducing gears requiring considerable motion of the helm to make a slight variation in the course.

The present invention avoids this by the provision of means and the arrangement of parts so that the energy of the currents, preferably those which come directly from the propeller of the ship, is used to move the rudder in the desired direction. To do this by a simple and efficient structure, which is another feature of this invention, I mount the rudder so that it can turn freely independent of any connection with the helm and mount on the rudder a small controlling rudder which is connected to be turned by the operation of the helm by suitable connections therewith. This small rudder acts on the larger ship rudder in a manner similar to the action of an ordinary rudder on a ship. That is to say, the position of the controlling rudder in the currents causes it to turn the ship rudder to the desired position and to hold it there as long as desired. This is done with very little energy on the part of the helmsman who can directly and manually operate the small controlling rudder.

The method of steering the ship by means of my improved rudder arrangement is another feature of this invention. It consists in first operating the small rudder so that it is out of line with the ship rudder in the proper direction so that the current striking thereagainst will rotate the ship's rudder, and then moving the controlling rudder to such a position that the large ship rudder will maintain the proper direction.

Other features and advantages will hereinafter appear.

In the accompanying drawings which show by way of example some physical embodiments of my invention.

Figure 1:
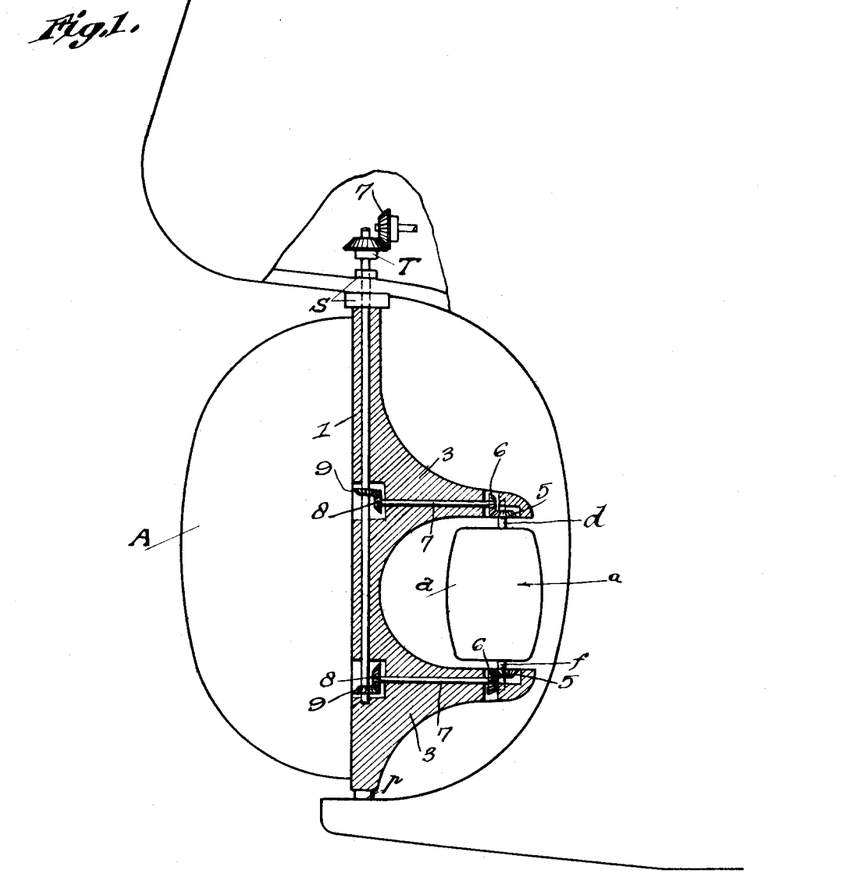
Figure 1, is a side view of the stern portion of a ship showing my invention as applied thereto.
Figure 2:
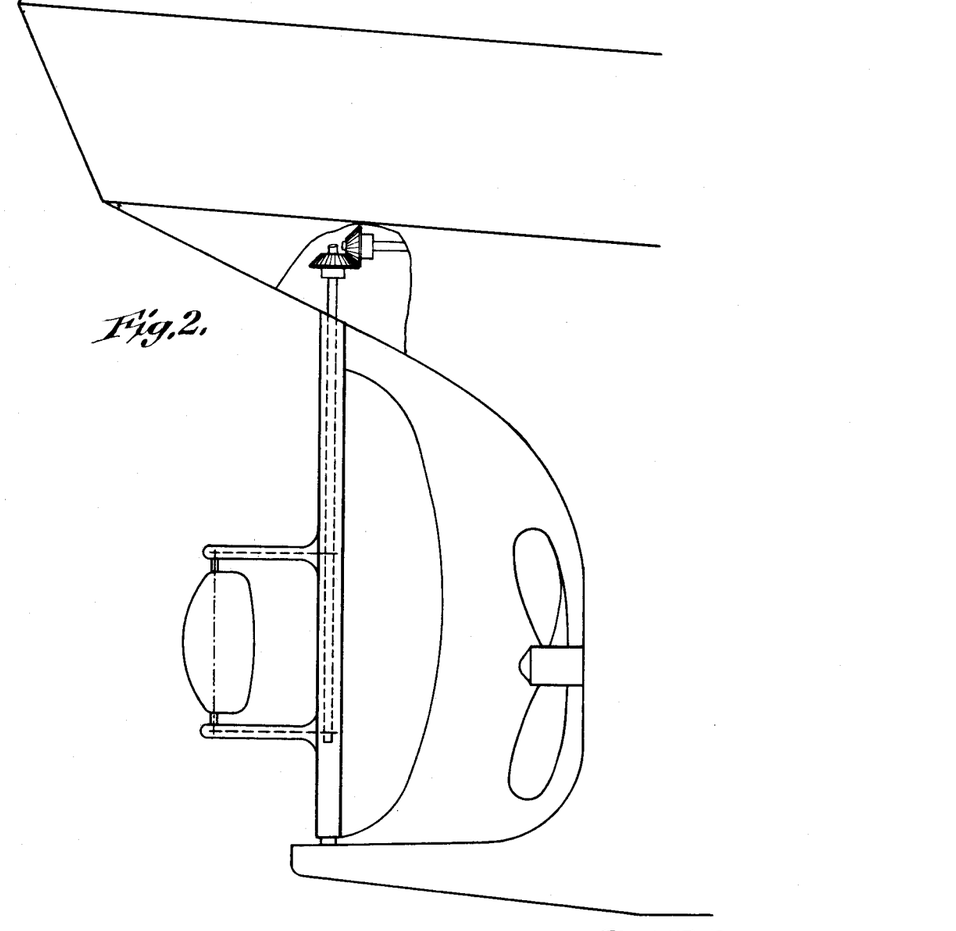
Fig. 2 is a view similar to Fig. 1 showing the position of the parts when the ship is going astern.

As shown in Figs. 1 and 2, the ship's rudder A is provided as usual, but instead of being directly connected with the helm of the ship it is freely mounted in its support so that it can swing to and fro without interference, having for this purpose a pivot pin $p$ at its lower end engaging an extension of the keel. The center rod or shaft 1 of the rudder A is provided at the side opposite the rudder blade, with a pair of arms 3 having a suitable space between them for the reception of the controlling rudder $a$ which is fulcrumed at $d$ and $f$ on said arms 3. The controlling rudder is small in comparison to the ship's rudder A and is only of such size as will be necessary in order that the controlling rudder may control the rudder A. The fulcrums $d$ and $f$ of the controlling rudder $a$ are so located with respect to the rudder blade 4 thereof that a greater area is presented on one side than on the other in the same manner as ordinary rudders.

The controlling rudder $a$ has its blade 4 controlled by the steering mechanism of the ship to which it is connected by suitable means. Means for this purpose are shown in Fig. 1 in which the fulcrums $d$ and $f$ of the rudder $a$ are provided at their ends with bevel gears 5, meshing with bevel gears 6 secured to shafts 7 mounted in the arms 3 of the ship's rudder A. These shafts 7 at their other ends have secured thereto bevel gears 8 meshing with bevel gears 9 fixed to a controlling shaft 10 mounted in the shaft 1 of the rudder A. The arrangement is such that the rudder $a$ is turned from above and below by the rotation of the shaft 10. The shaft 10 in turn has a bevel gear T meshing with another bevel gear connected by any suitable means to the helm of the ship. Therefore when the shaft 10 is rotated the rudder $a$ is given a rotating movement to control the rudder A as will be presently described. The shaft 10 extending between the shaft 1 of the rudder A and the bottom of the ship serves to hold the upper end of the rudder in proper position, collars S being provided for fixing the rudder and shaft in position against accidental displacement.

When the ship is going ahead the controlling rudder is located between the stern of the ship and the rudder A as shown in Fig. 1 but when the ship is going astern the rudder A is located between the ship and the controlling rudder, as shown in Fig. 2.

Figure 3:
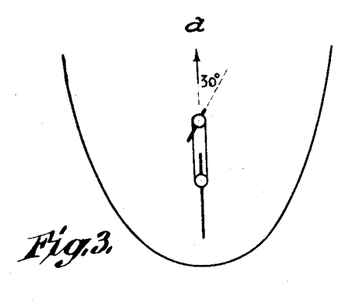
Figs. 3 to 6 are diagrammatic views showing the various positions of the controlling rudder during a steering operation, the ship going ahead.
Figure 4:
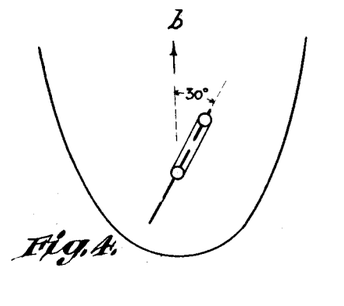
Figure 5:
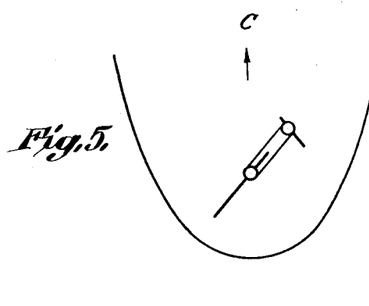
Figure 6:
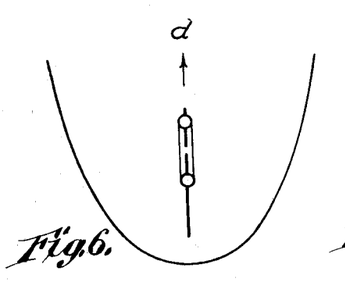

The positions assumed by the rudders in steering the ship to port are shown in Figs. 3 to 6. The first operation is to move the controlling rudder to port the proper number of degrees as shown in Fig. 3. This will cause the water impinging on its port face to tend to rotate the rudder A about its axis, which it does. As the rudder A moves to port the controlling rudder is manipulated until the proper turn to port is made. Then the controlling rudder is rotated to starboard causing the currents to impinge on its starboard face and thus rotate the rudder A to starboard as shown in Fig. 5 finally bringing it back to its original position as shown in Fig. 6. Of course, in the cases above described the ship is presumed to be going ahead.

Figure 7:
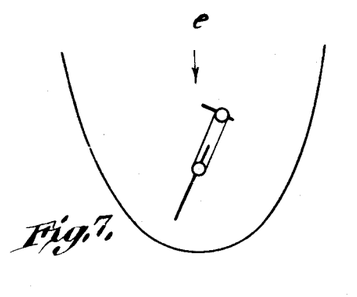
Figs. 7 to 10 are diagrammatic views showing the various positions of the controlling rudder assumed during the reversing of the ship's direction from ahead to astern.
Figure 8:
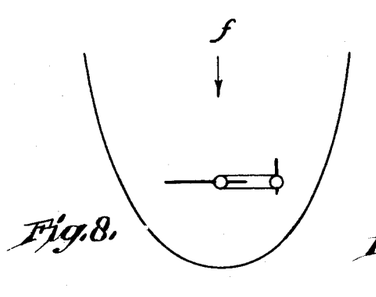
Figure 9:
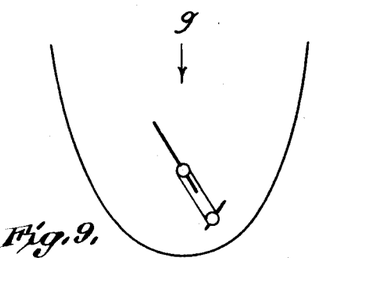
Figure 10:
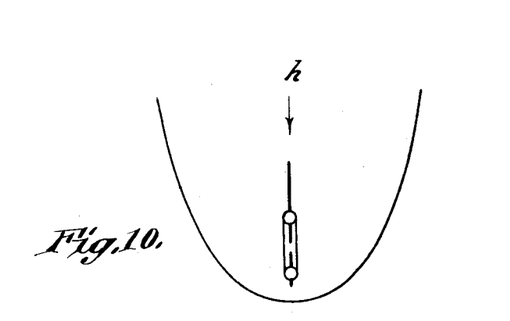
Figure 11:
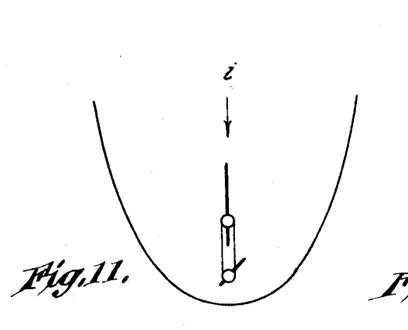
Figs. 11 to 13 show the various positions assumed by the controlling rudder during steering operations while the ship is going astern.
Figure 12:
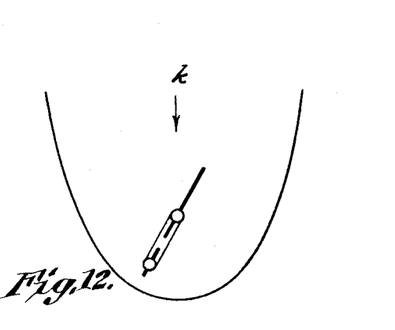
Figure 13:
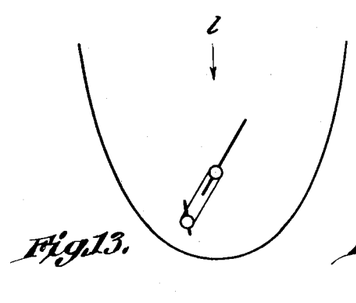
Figure 14:
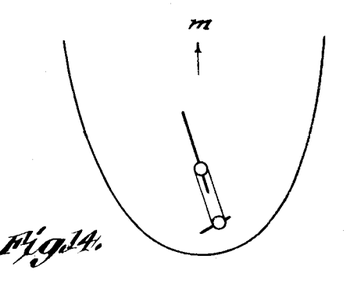
Figs. 14 to 18 show the various positions of the controlling rudder assumed during a reversing of the ship's direction from astern to ahead.
Figure 15:
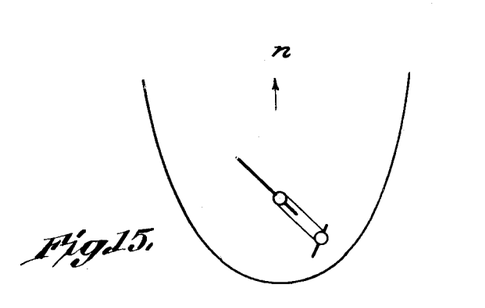
Figure 16:
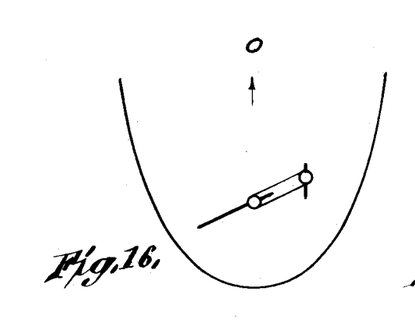
Figure 17:
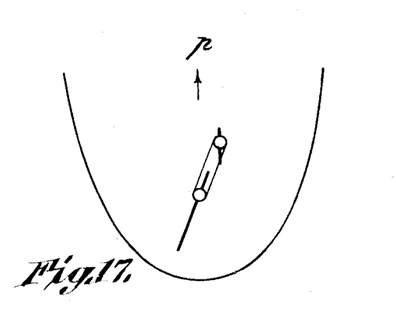
Figure 18:
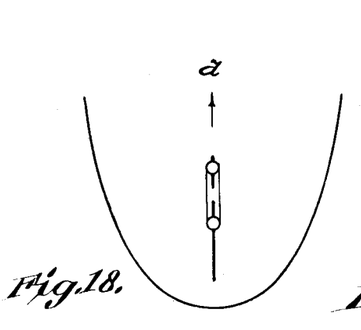

When the ship is going astern, however, the rudder A rotates for 180°, changing place with the rudder $a$ with respect to the ship. The operation of reversing the rudder for this purpose is shown in Figs. 7, 8, 9 and 10. In Fig. 7 the controlling rudder is moved full to port (although it matters not in which direction it is turned) so as to cause the rudder A to be rotated clockwise as shown in Figs. 8 and 9. After the rudder A passes its central position as shown in Fig. 8 the controlling rudder $a$ is moved to starboard as shown in Fig. 9, whereupon the currents striking against the rudder $a$ complete the rotation of the rudder A when it occupies the position shown in Fig. 10. The action of the rudders to steer when going astern is shown in Figs. 11, 12 and 13. In Fig. 11 the controlling rudder is shown as swung to starboard, while in Fig. 12 the rudder A has been moved to starboard by the action of the current on the controlling rudder. Fig. 13 shows the position of the controlling rudder when it is desired to bring the ship's rudder back to aline with the ship's keel.

Figs. 14 to 18 show the action of the rudders when the direction of the ship is again reversed. Since the action is substantially the same as that shown and described in connection with Figs. 7 to 10, it will not be here described.

Figure 19:
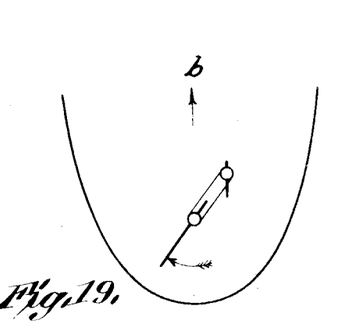
Fig. 19 shows the action of the rudders when the ship's rudder is acted on by a rough sea.
Figure 20:
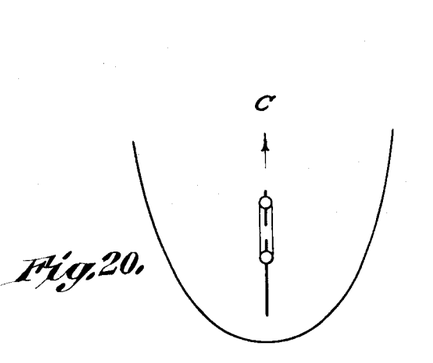
Fig. 20 shows the ship's rudder returned to normal position from that shown in Fig. 19 by the balancing operation of the controlling rudder.
Figures 21, 22, 23:
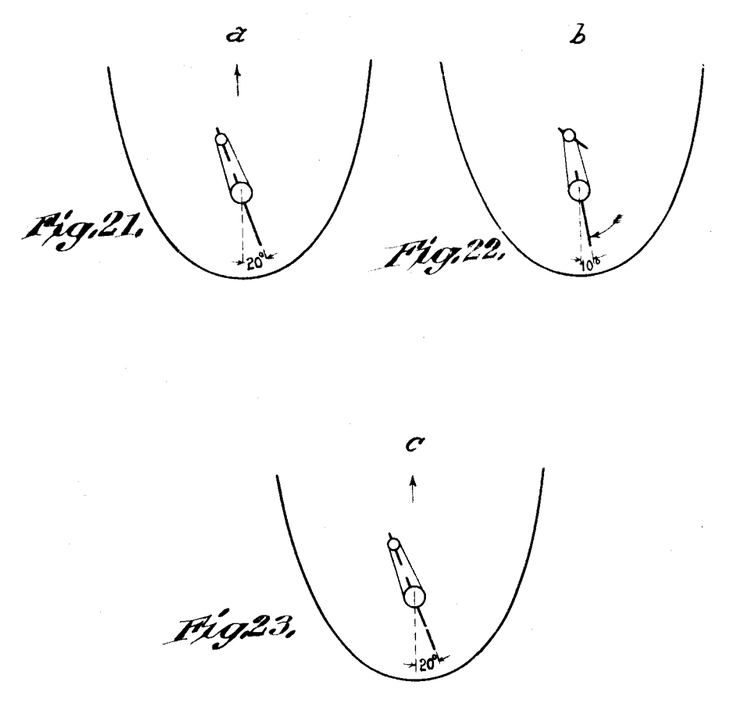
Figs. 21, 22 and 23 are diagrammatic views of a modification in which the controlling rudder is connected to the ship's rudder by mechanical connections.

When the ship encounters a heavy sea the rudder arrangement of the present invention is self balancing and protects the helm mechanism and the other parts of the ship from the sudden blows of a wave against the rudder A. The action of the parts under these conditions is shown in Figs. 19 and 20. In Fig. 19 the wave has struck against the rudder A in the direction of the arrow shown and has caused the rudder to be swung to port. The controlling rudder has not, however, been moved out of alinement with the keel of the ship. Therefore when the force of the wave subsides the rudder A will be returned to alinement with the keel by the currents from the propeller to the normal position again, shown in Fig. 20. In some cases it may be desirable to cause the controlling rudder to have a counter effect rather than to be merely passive in a rough sea, and for this purpose there are provided in one embodiment of my invention, shown in Figs. 21, 22 and 23, mechanical connections between the controlling rudder and the ship's rudder so that when the rudder A is swung by a wave the controlling rudder is moved so that the currents from the ship will act upon it to return the rudder A to the position it occupied before it was struck by the wave. This arrangement is advantageous because it returns the rudder to its previous position even if that position was not in alinement with the keel, as in the case of steering.

Figures 24, 25:
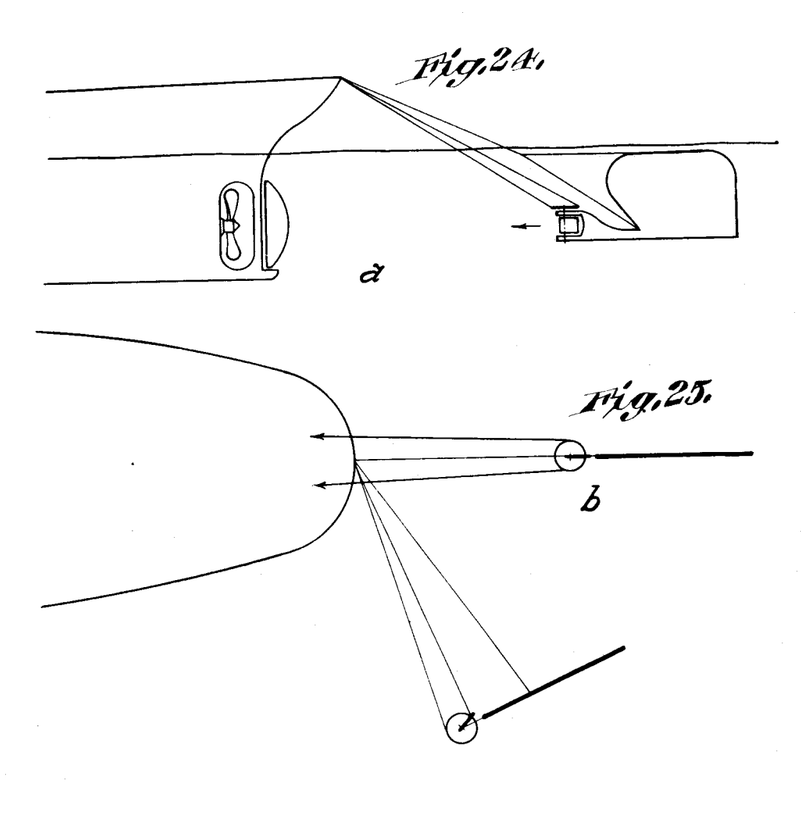
Fig. 24 is a diagrammatic plan view and Fig. 25 is a diagrammatic side view of jury rudder according to the present invention.
Figure 26:
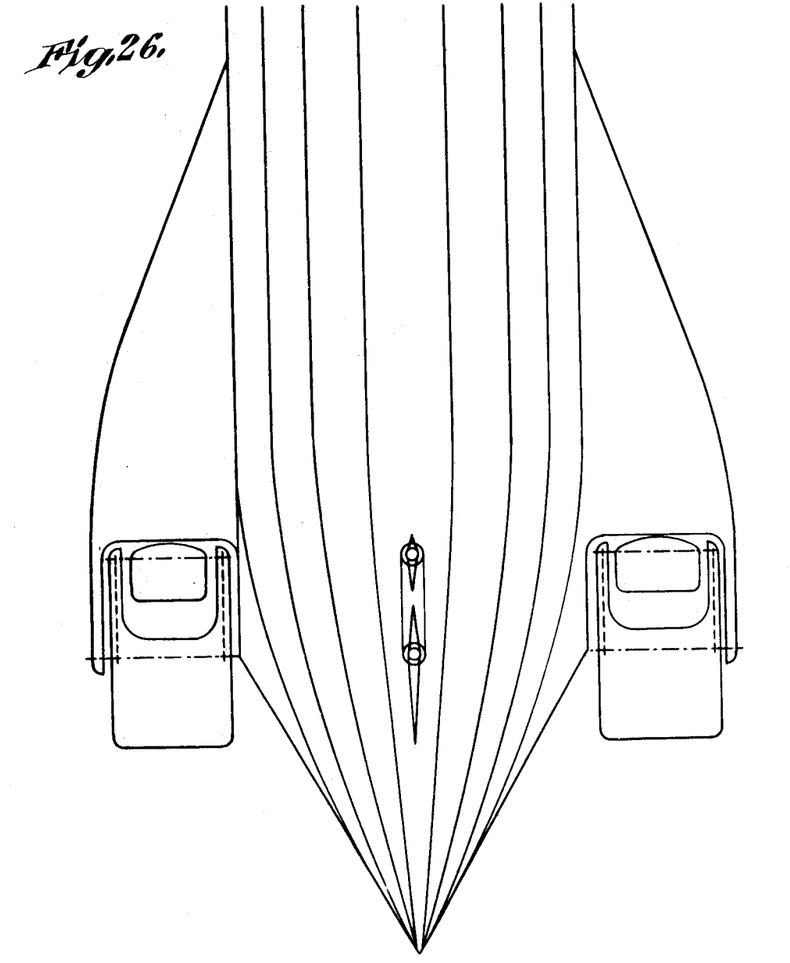
Fig. 26 shows the present invention as applied to an air-ship, showing both horizontal and vertical rudders.

Figs. 24 and 25 show the application of the present invention to a jury rudder, and in Fig. 26 the present invention is shown as applied to an air ship both for the elevating and steering rudders.

Although the present invention has been described in connection with marine vessels it should be understood that it is equally well applicable to all other movable carriers such as submarines, airplanes, hydroplanes, hydroairplanes, dirigible airships, etc., and that this invention is not limited to marine vessels except as specified in the accompanying claims.

Variations may be resorted to within the scope of my invention and portions of the improvements may be used without others.

I claim as my invention:

1. In combination with a ship; of a ship's rudder; means for mounting the rudder on the ship to have a free rotary movement; a controlling rudder connected to the ship's rudder and having a swinging movement relative to the ship's rudder; steering mechanism on the ship; and gearing between the steering mechanism and the controller for swinging the controlling rudder whereby the latter may move the ship's rudder for steering the ship.

2. In combination with a ship; of a ship's rudder mounted on the ship for free rotary movement; a controlling rudder connected to the ship's rudder; and means whereby the controlling rudder may have its position altered to cause the current through which it passes to shift the position of the ship's rudder, a predetermined alteration of the position of the controlling rudder causing the ship's rudder to reverse its position relative to the ship when a reversal of the direction of travel of the ship from ahead to astern and vice versa is effected.

3. In combination with a ship; of a ship's rudder mounted on the ship for free rotary movement; a controlling rudder connected to the ship's rudder; and means whereby the controlling rudder may have its position altered to cause the current through which it passes to shift the position of the ship's rudder, the arrangement being such that the controlling rudder is in advance of the ship's rudder both when going ahead and astern.

4. In combination with a ship; of a ship's rudder; means for mounting the ship's rudder on the ship to have free rotary movement; arms mounted on the ship's rudder; a controlling rudder mounted on said arms; a control shaft mounted in the rudder; and gearing between the control shaft and the controlling rudder whereby the position of the latter may be varied, the ship's rudder being freely rotatable independently of said gearing and being controlled solely by the controlling rudder.

5. In combination with a ship; of a ship's rudder; means for mounting the ship's rudder on the ship to have free rotary movement; a controller rudder mounted on the ship's rudder and having a swinging movement relative to the ship's rudder; a control shaft mounted in the ship's rudder; and gearing between the control shaft and the controlling rudder whereby the position of the latter may be varied, the ship's rudder being freely rotatable independently of said gearing and being controlled solely by the controlling rudder.

In witness whereof I have hereunto set my hand in the presence of two witnesses.

FRANCISCO CONTI.

Witnesses:
J. C. FUCHS,
RODOLFO RAMÍREZ.